(12) United States Patent
Peng

(10) Patent No.: US 7,127,539 B2
(45) Date of Patent: Oct. 24, 2006

(54) STATISTIC METHOD FOR ARBITRATION

(75) Inventor: Sheng-Chang Peng, Taipei (TW)

(73) Assignee: Via Technologies, Inc., Taipei (TW)

( * ) Notice: Subject to any disclaimer, the term of this patent is extended or adjusted under 35 U.S.C. 154(b) by 220 days.

(21) Appl. No.: 10/849,915

(22) Filed: May 21, 2004

(65) Prior Publication Data

US 2004/0267995 A1 Dec. 30, 2004

(30) Foreign Application Priority Data

May 23, 2003 (TW) .............................. 92113917 A

(51) Int. Cl.
G06F 12/00 (2006.01)
G06F 12/13 (2006.01)
G06F 13/368 (2006.01)
G06F 13/36 (2006.01)

(52) U.S. Cl. ...................... 710/241; 710/244; 710/120; 710/113; 710/240

(58) Field of Classification Search ........ 710/107–125, 710/240–244

See application file for complete search history.

(56) References Cited

U.S. PATENT DOCUMENTS

| | | | | |
|---|---|---|---|---|
| 5,509,125 A | * | 4/1996 | Johnson et al. | 710/120 |
| 5,560,016 A | * | 9/1996 | Fiebrich et al. | 710/240 |
| 6,131,135 A | * | 10/2000 | Abramson et al. | 710/113 |
| 6,990,541 B1 | * | 1/2006 | Clayton | 710/244 |
| 2003/0088722 A1 | * | 5/2003 | Price | 710/244 |

* cited by examiner

Primary Examiner—Rehana Perveen
Assistant Examiner—Brian Misiura
(74) Attorney, Agent, or Firm—Rosenberg, Klein & Lee

(57) ABSTRACT

A statistic method for arbitration is provided, implementing in an arbitration system comprising a bus, a main controller connected to the bus, and a plurality of peripheral devices able to be accessed by the main controller through the bus. The statistic method for arbitration is in response to various conditions where a bus is shared by peripheral devices, characterized in that a host at arbitration dynamically modulates the peripheral devices' access through the bus by utilizing an attenuation function to perform operation on a preceding cycle and a statistic value representing the use of the bus by the peripheral devices in response to the peripheral devices' access through the bus.

7 Claims, 4 Drawing Sheets

| granted peripheral device | 1 | 1 | 2 | 3 | 1 | 1 | 4 | 2 | 1 | 4 | ... |
|---|---|---|---|---|---|---|---|---|---|---|---|
| first peripheral device | 1 | 2 | 2 | 2 | 3 | 4 | 4 | 4 | 5 | 5 | ... |
| second peripheral device | 0 | 0 | 1 | 1 | 1 | 1 | 1 | 2 | 2 | 2 | ... |
| third peripheral device | 0 | 0 | 0 | 1 | 1 | 1 | 1 | 1 | 1 | 1 | ... |
| fourth peripheral device | 0 | 0 | 0 | 0 | 0 | 0 | 1 | 1 | 1 | 2 | ... |

FIG. 2
(PRIOR ART)

| granted peripheral device | 1 | 1 | 2 | 3 | 1 | 1 | 4 | 2 | 1 | 4 | ... |
|---|---|---|---|---|---|---|---|---|---|---|---|
| first peripheral device | 1 | $1\frac{1}{2}$ | $\frac{3}{4}$ | $\frac{3}{8}$ | $1\frac{3}{16}$ | $1\frac{19}{32}$ | $\frac{51}{64}$ | $\frac{51}{128}$ | $1\frac{51}{256}$ | $\frac{307}{512}$ | ... |
| second peripheral device | 0 | 0 | 1 | $\frac{1}{2}$ | $\frac{1}{4}$ | $\frac{1}{8}$ | $\frac{1}{16}$ | $1\frac{1}{32}$ | $\frac{33}{64}$ | $\frac{33}{128}$ | ... |
| third peripheral device | 0 | 0 | 0 | 1 | $\frac{1}{2}$ | $\frac{1}{4}$ | $\frac{1}{8}$ | $\frac{1}{16}$ | $\frac{1}{32}$ | $\frac{1}{64}$ | ... |
| fourth peripheral device | 0 | 0 | 0 | 0 | 0 | 0 | 1 | $\frac{1}{2}$ | $\frac{1}{4}$ | $1\frac{1}{8}$ | ... |

FIG. 4

STATISTIC METHOD FOR ARBITRATION

BACKGROUND OF THE INVENTION

1. Field of the Invention

The present invention generally relates to a statistic method for arbitration and more particularly, to a statistic method for arbitration in response to various conditions where a bus is shared by a plurality of peripheral devices, such that a host at arbitration dynamically modulates the peripheral devices' access through the bus by utilizing an attenuation function to perform operation on a preceding cycle.

2. Description of the Prior Art

In a general computer architecture, there are many devices and peripheral devices, between which a plurality of buses are provided for signal transmission and/or data communication. For the sake of high efficiency, a bus is often shared by a plurality of peripheral devices.

However, a bus can only be accessed by a peripheral device during a certain period of time. It has become a key issue to decide which one of the plurality of peripheral devices to access the bus when a number of peripheral devices sharing the same bus are required to access the bus at the same time.

Generally speaking, an ideal arbitration architecture is required to satisfy the requirements: fairness and efficiency. A fair arbitrator protects any peripheral device from neither being completely forbidden to access through the bus nor being not granted an unreasonably long time to access through the bus, even if the peripheral device has a very low priority. An ideal arbitrator granting the bus to be efficiently accessed, however, is able to let a peripheral device with higher priority unfairly get access through the bus. Moreover, some of the peripheral devices are limited in bandwidth. In other words, the arbitrator must be able to provide the peripheral devices with a certain amount of bandwidth such that the peripheral devices can operate without problems. More particularly, the industry has developed various ways to give consideration to both sides of improving the efficiency and maintaining the bandwidth and fairness for the peripheral devices.

Please refer to FIG. 1, which is a block diagram schematically illustrating a conventional arbitration system. The arbitration system comprises a common bus 12, which is connected to a main bridge 10. The main bridge 10 comprises a bus arbitrator 105 so as to arbitrate a plurality of peripheral devices connected to the bus 12. Moreover, a main controller 14 is provided so as to control a plurality of peripheral devices such as the first peripheral device 161, the second peripheral device 163, the third peripheral device 165, and the fourth peripheral device 167. The plurality of peripheral devices are connected to the bus 12 through the main controller 14. Meanwhile, an arbitrator 145 in the main controller 14 is used to determine which peripheral device has the higher priority.

In the above-mentioned system, even though some peripheral devices may request a lowest limit in bandwidth that the bus 12 can provide, the lowest limit in bandwidth can change in response to the operation of the system. If the arbitrator 145 arbitrates the peripheral devices according to their requests in bandwidth, it usually occurs that the peripheral device requesting a higher lowest limit in bandwidth occupies most of the operation time of the bus 12. Accordingly, the other peripheral devices can hardly get access through the bus 12 even when the former peripheral device is idle.

In order to overcome the afore-mentioned problem, the industry has developed a method, in which a register (not shown) is provided in the main controller 14 so as to keep track of the conditions of the peripheral devices granted to get access to the bus. As shown in FIG. 2, which is a schematic diagram showing a conventional statistic method for arbitration. In FIG. 2, the numbers indicate the number of times each peripheral device is granted to get access through the bus. In other words, the column corresponding to the first peripheral device counts 1 when the peripheral devices request access through the bus and the first peripheral device gets access through the bus. Moreover, the column corresponding to the first peripheral device counts 2 when the first peripheral device gets access through the bus again. Similarly, the columns corresponding to the second and the third peripheral devices count the same way.

Since any peripheral device can not possibly keep operating with its highest load, the demand for access through the bus for each peripheral device varies with time. Accordingly, the arbitrator in the main controller analyzes the demand for access through the bus for each peripheral device by using the statistic number in the register after a pre-determined period of time (for example, 1000 clock pulses), thereby rearranging the priority and number of times each peripheral device is granted to get access through the bus. As a result, the problem that fixed allocation of bus bandwidth results in low efficiency can be overcome.

However, the above-mentioned method can only provide a follow-up cycle only when the former cycle of counting has been lasting for a certain period of time. In other words, the arbitration system can not respond to the demand for access through the bus for each peripheral device immediately such that the arbitration system may fail to arbitrate the peripheral devices when one of the peripheral devices has stronger demand than the others.

Therefore, there is need in providing a statistic method for arbitration so as to overcome the aforementioned problems.

SUMMARY OF THE INVENTION

Accordingly, it is the primary object of the present invention to provide a statistic method for arbitration, in which an attenuation function is used to perform operation on the result of a preceding clock cycle and an updated statistic value results from the state corresponding to each peripheral device, so as to show the state of each peripheral device in each clock cycle as a reference for dynamic arbitration.

It is a secondary object of the present invention to provide a statistic method for arbitration, in which the statistic value is multiplied by a value of 0~1, so as to cause attenuation and simplify the operational complexity.

It is another object of the present invention to provide a statistic method for arbitration, in which the attenuation function is predetermined to be useful in various applications.

In order to achieve the foregoing objects, the present invention provides a statistic method for arbitration for use in an arbitration system comprising a bus, a main controller connected to said bus, and a plurality of peripheral devices able to be accessed through said bus by said main controller, said method comprising steps of:

providing a plurality of statistic values corresponding to said plurality of peripheral devices, wherein said main controller arbitrates according to said plurality of statistic values during a clock cycle;

identifying one of said plurality of peripheral devices with a first value, wherein said peripheral device sends an access request signal to said main controller and is granted to get access through said bus;

identifying another one of said plurality of peripheral devices with a second value, wherein said another peripheral device sends an access request signal to said main controller and is not granted to get access through said bus; and using an attenuation function to perform operation on the result of a preceding clock cycle and obtaining an updated statistic value by adding said first value and said second value corresponding to each peripheral device, so as to show the state of each peripheral device in each clock cycle as a reference for dynamic arbitration.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein:

FIG. 2 is a schematic diagram showing a conventional statistic method for arbitration in accordance with the prior art;

FIG. 4 is a block diagram schematically illustrating a statistic method for arbitration in accordance with the present invention.

DETAILED DESCRIPTION OF THE INVENTION

The present invention providing a statistic method for arbitration can be exemplified by the preferred embodiment as described hereinafter.

Figure 1:
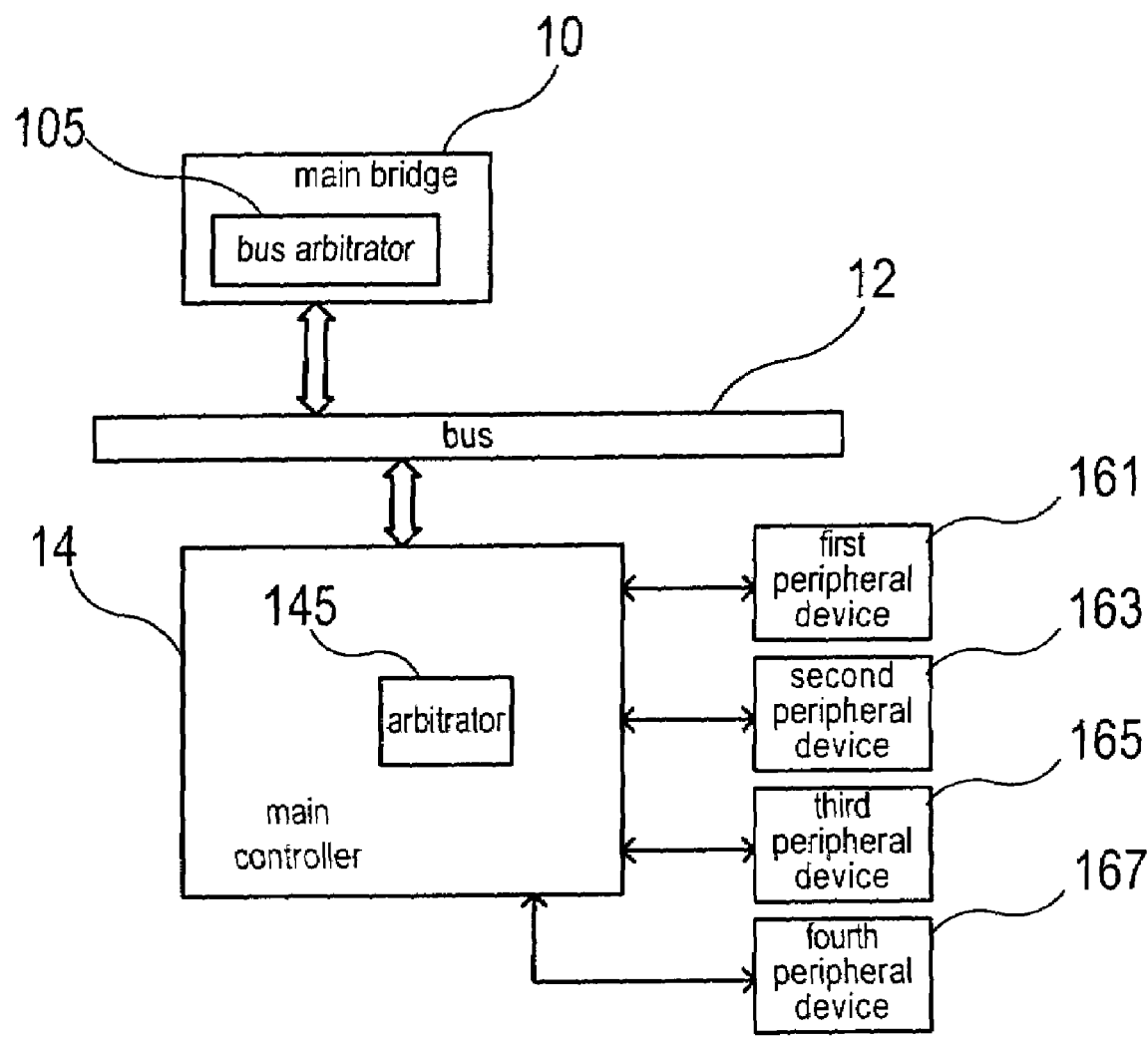
FIG. 1 is a block diagram schematically illustrating a conventional arbitration system in accordance with the prior art.
Figure 3:
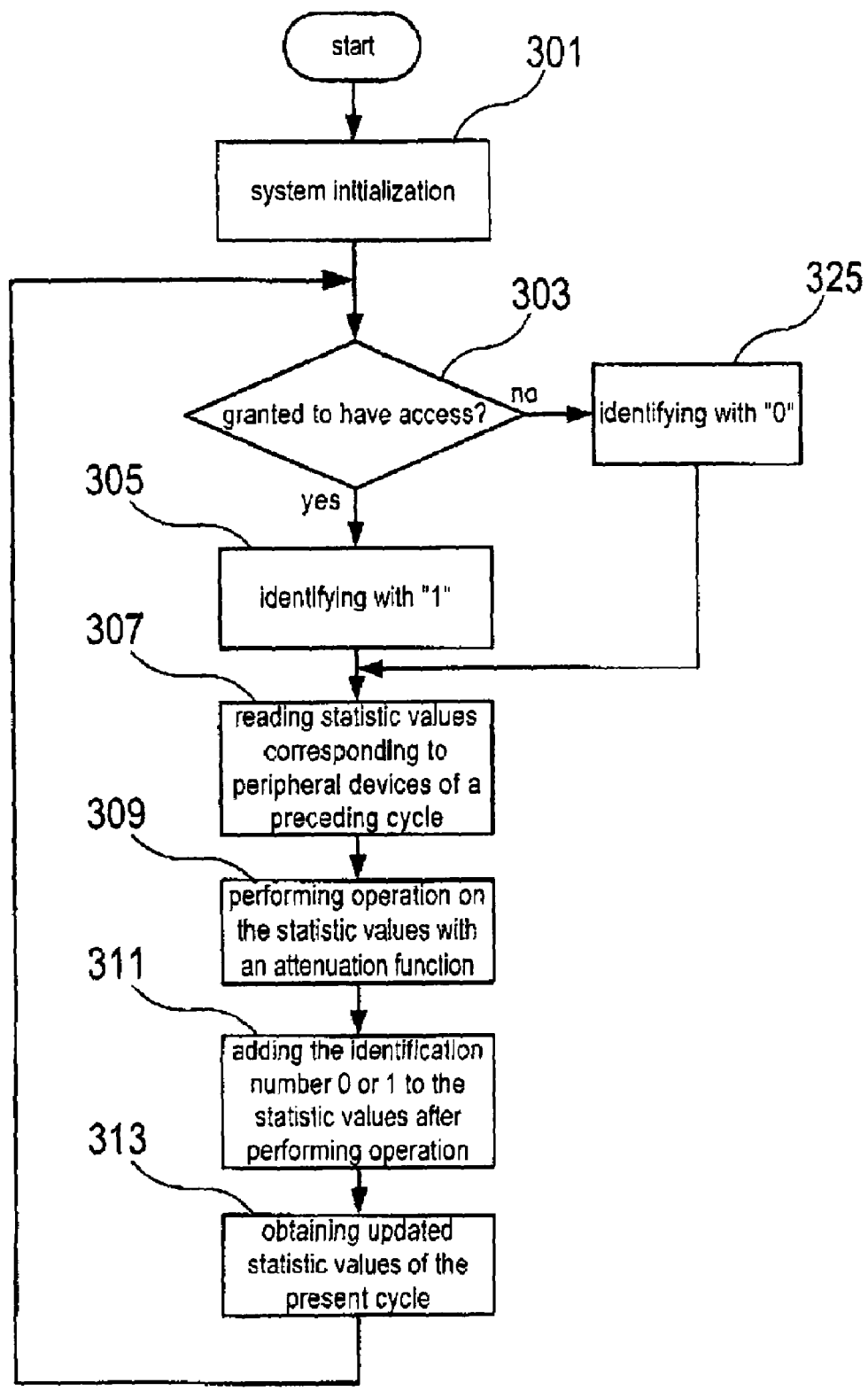
FIG. 3 is a flow chart schematically illustrating a statistic method for arbitration in accordance with one preferred embodiment of the present invention.

To start with, please refer to FIG. 3, which is a flow chart schematically illustrating a statistic method for arbitration in accordance with one preferred embodiment of the present invention. In the present invention, the statistic method for arbitration is for use in an arbitration system as shown in FIG. 1 or any other arbitration system comprising a bus, a main controller connected to the bus, and a plurality of peripheral devices able to be accessed through the bus by the main controller. More particularly, the main controller further comprises an arbitrator so as to arbitrate the access requests of the plurality of peripheral devices. Furthermore, the main controller comprises a register so as to keep track of the statistic values corresponding to the plurality of peripheral devices.

As shown in FIG. 3, the statistic method for arbitration in accordance with the present invention comprises the following steps.

Prior to operation of the system, the system is initialized and the statistic values (recorded in the registered in the main controller) corresponding to the peripheral devices are pre-determined as 0, as shown in Step 301. Afterwards, the condition how the bus is accessed by the peripheral devices is detected so as to determine whether the access request from the peripheral devices to the main controller is granted, as shown in Step 303. If yes, the peripheral device is identified with a first value (such as "1"), as shown in Step 305; if not, the peripheral device is identified with a second value (such as "0"), as shown in Step 325.

The statistic values (of a preceding cycle) corresponding to the peripheral devices are read from the register, as shown in Step 307. Then we perform operation on the statistic values with an attenuation function, as shown in Step 309. More particularly, the attenuation function is used to perform operation on a value and results in another value smaller than the value.

Later, the identification number 0 or 1 is added to the statistic values after performing operation so as to obtain updated statistic values of the present cycle, as shown in Step 311. Finally, the updated statistic values are loaded into the register, as shown in Step 311.

A set of statistic values of a clock cycle can be obtained by repeating Step 303 to 325, and thus be a reference for arbitration. The statistic method can be implemented by using firmware.

Please further refer to FIG. 4, which is a block diagram schematically illustrating a statistic method for arbitration in accordance with the present invention. In the statistic method for arbitration of the present invention, the attenuation factor of the attenuation function is between 0 and 1, and can be pre-determined according to practical uses. As shows in FIG. 4, in the preferred embodiment, the attenuation factor is ½ for example. More particularly, in the first clock cycle, the first peripheral device has top priority to get access through the bus, and thus is identified as "1". The other peripheral devices such as the second peripheral, the third peripheral device and the fourth peripheral device are identified as "0". After initialization, the statistic value for each peripheral device is set to be 0. The statistic value is still 0 after being multiplied with the attenuation function. Therefore, it is clear that the statistic value for the first peripheral device in the first clock cycle is 1, while the statistic values for the other peripheral devices are 0.

In the second clock cycle, the first peripheral device still has top priority to get access through the bus, and thus is identified as "1". The other peripheral devices such as the second peripheral device, the third peripheral device and the fourth peripheral device are identified as "0" in the second clock cycle. After the attenuation function performs operation on the statistic values, (for example, 1*½ for the first peripheral device) and the identified value is added (for example, 1 for the first peripheral device and 0 for the others), statistic values for the second clock cycle can be obtained, more specifically, 1½ for the first peripheral device and 0 for the others.

In the third clock cycle, the second peripheral device has top priority to get access through the bus, and thus is identified as "1". The other peripheral devices such as the first peripheral, the third peripheral device and the fourth peripheral device are identified as "0" in the third clock cycle. After the attenuation function performs operation on the statistic values, (for example, 1½*½ for the first peripheral device) and the identified value is added (for example, 1 for the second peripheral device and 0 for the others), statistic values for the third clock cycle can be obtained, more specifically, ¾ for the first peripheral device, 1 for the second peripheral device and 0 for the others;

In the fourth clock cycle, the third peripheral device has top priority to get access through the bus, and thus is identified as "1". The other peripheral devices such as the first peripheral device, the second peripheral device and the fourth peripheral device are identified as "0" in the fourth clock cycle. After the attenuation function performs operation on the statistic values, (for example, ¾*½ for the first peripheral device and 1 *½ for the second peripheral device) and the identified value is added (for example, 1 for the third peripheral device and 0 for the others), statistic values for the fourth clock cycle can be obtained, more specifically, ⅜ for the first peripheral device, ½ for the second peripheral device, 1 for the third peripheral device and 0 for the fourth peripheral device.

Similarly, we can obtain statistic values for the other clock cycles, and thus obtain a table as shown in FIG. 4.

In FIG. 4, for each clock cycle, whether one of the devices has top priority to get access through the bus is shown. Moreover, the condition of the device in the preceding clock cycle has lesser effect on the follow-up clock cycle according to the attenuation factor.

According to the above discussion, it is apparent that the present invention discloses a statistic method for arbitration, in which an attenuation function is used to perform operation on the result of a preceding clock cycle and an updated statistic value results from the state corresponding to each peripheral device, so as to show the state of each peripheral device in each clock cycle as a reference for dynamic arbitration.

Although this invention has been disclosed and illustrated with is reference to particular embodiments, the principles involved are susceptible for use in numerous other embodiments that will be apparent to persons skilled in the art. This invention is, therefore, to be limited only as indicated by the scope of the appended claims.

What is claimed is:

1. A statistic method for arbitration for use in an arbitration system comprising a bus, a main controller connected to said bus, and a plurality of peripheral devices able to be accessed by said main controller through said bus, said method comprising steps of:

providing a plurality of statistic values corresponding to said plurality of peripheral devices, wherein said main controller arbitrates according to said plurality of statistic values during a clock cycle;

identifying one of said plurality of peripheral devices with a first value, wherein said peripheral device sends an access request signal to said main controller, and granted to get access through said bus;

identifying another one of said plurality of peripheral devices with a second value, wherein said another peripheral device sends an access request signal to said main controller and is not granted to access through said bus; and using an attenuation factor having a value between 0 and 1 to multiply the results of a preceding clock cycle and obtaining updated statistic values by adding one of said first value and said second value corresponding to each peripheral device, so as to show the state of each peripheral device in each clock cycle as a reference for dynamic arbitration.

2. The statistic method for arbitration as claimed in claim 1, wherein said first value is 1.

3. The statistic method for arbitration as claimed in claim 1, wherein said second value is 0.

4. The statistic method for arbitration as claimed in claim 1, wherein said plurality of statistic values corresponding to said plurality of peripheral devices are pre-determined as 0 when said arbitration system is initialized.

5. The statistic method for arbitration as claimed in claim 1, wherein said main controller comprises an arbitrator so as to arbitrate the access requests of said plurality of peripheral devices.

6. The statistic method for arbitration as claimed in claim 1, wherein said main controller comprises a register so as to keep track of said statistic values corresponding to said plurality of peripheral devices.

7. The statistic method for arbitration as claimed in claim 1, wherein said statistic method is implemented as a firmware program.

* * * * *